US010991345B2

(12) United States Patent
Wood et al.

(10) Patent No.: US 10,991,345 B2
(45) Date of Patent: Apr. 27, 2021

(54) MANAGING TRANSITIONS OF ADAPTIVE DISPLAY RATES FOR DIFFERENT VIDEO PLAYBACK SCENARIOS

(71) Applicant: Microsoft Technology Licensing, LLC, Redmond, WA (US)

(72) Inventors: Daniel Wood, Seattle, WA (US); Vlad Alexandrov, Kirkland, WA (US); Zhigang Xu, Bellevue, WA (US); Max McMullen, Seattle, WA (US); Marcus Andrews, Bellevue, WA (US); Bennett Sorbo, Seattle, WA (US); Andrei Baioura, Redmond, WA (US); Mikhail Leonov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 16/399,080

(22) Filed: Apr. 30, 2019

(65) Prior Publication Data
US 2019/0355331 A1 Nov. 21, 2019

Related U.S. Application Data

(63) Continuation of application No. 15/846,254, filed on Dec. 19, 2017, now Pat. No. 10,325,573, which is a
(Continued)

(51) Int. Cl.
*G09G 5/391* (2006.01)
*G09G 5/12* (2006.01)
*G06F 3/14* (2006.01)

(52) U.S. Cl.
CPC ............... *G09G 5/391* (2013.01); *G06F 3/14* (2013.01); *G09G 5/12* (2013.01);
(Continued)

(58) Field of Classification Search
None
See application file for complete search history.

(56) References Cited

U.S. PATENT DOCUMENTS 7,325,042 B1 * 1/2008 Soscia ................... H04L 67/325
709/219
7,683,906 B2 3/2010 Senior et al.
(Continued)

FOREIGN PATENT DOCUMENTS

CA 2754672 A1 9/2010

OTHER PUBLICATIONS

"Office Action Issued in Canadian Patent Application No. 2,913,513", dated Apr. 18, 2019, 7 Pages.
(Continued)

*Primary Examiner* — Saptarshi Mazumder

(57) ABSTRACT

To manage dynamic adjustment of the refresh rate of a computer display, the operating system defines at least two playback modes: one or more custom modes that can be selected by applications, and a standard mode which is a default setting for the system that can be expected by applications. The operating system provides an application programming interface that enables an application to request using a custom mode. If approved to use the custom mode, then the application presents frames for display based on the custom mode. The operating system stores timing data for each buffered frame indicating how to play the frame in both standard mode and the custom mode. If a transition back to the standard mode occurs, the operating system uses the timing data to properly present frames of video until the application stops generating frames of video in the custom mode.

20 Claims, 7 Drawing Sheets

Related U.S. Application Data continuation of application No. 13/916,623, filed on Jun. 13, 2013, now Pat. No. 9,858,899.

(52) U.S. Cl.
CPC ............. *G09G 2330/021* (2013.01); *G09G 2340/0435* (2013.01); *G09G 2360/02* (2013.01)

(56) References Cited

U.S. PATENT DOCUMENTS

| | | | |
|---|---|---|---|
| 8,334,857 B1* | 12/2012 | Ogrinc | G09G 5/377 345/204 |
| 8,451,279 B2 | 5/2013 | Gorla et al. | |
| 2011/0234649 A1* | 9/2011 | Ooishi | G09G 3/3648 345/690 |
| 2012/0068993 A1* | 3/2012 | Kambhatla | G09G 5/18 345/213 |
| 2012/0154559 A1* | 6/2012 | Voss | H04N 13/327 348/55 |

OTHER PUBLICATIONS

"Office Action Issued in Canadian Patent Application No. 2913513", dated Apr. 8, 2020, 3 Pages.

"Office Action Issued in Korean Patent Application No. 10-2015-7035298", dated Aug. 20, 2019, 13 Pages.

"Office Action Issued in Canadian Patent Application No. 2913513", dated Oct. 5, 2020, 5 Pages.

"Office Action Issued in Brazil Patent Application No. BR112015030905-4", dated Jul. 28, 2020, 5 Pages.

"Office Action Issued in Indian Patent Application No. 7594/CHENP/2015", dated Jun. 20, 2020, 6 Pages.

* cited by examiner

|  | From Application | | Generated by Operating System | | |
| --- | --- | --- | --- | --- | --- |
|  | Interval 304 | Rate flag 306 | Standard Interval 308 | Custom Interval 310 | Custom Duration 312 |
| Frame 1 | 2 | TRUE | 2 | 2 | 208333 |
| Frame 2 | 2 | TRUE | 3 | 2 | 208333 |
| Frame 3 | 2 | TRUE | 2 | 2 | 208333 |
| Frame 4 | 2 | TRUE | 3 | 2 | 208333 |
| Frame 5 | 2 | TRUE | 2 | 2 | 208333 |
| Frame 6 | 2 | TRUE | 3 | 2 | 208333 |

FIG.3

|  | From Application | | Generated by operating system | | | |
|---|---|---|---|---|---|---|
|  | Interval 404 | Rate flag 406 | Standard Interval 408 | Custom Interval 410 | Custom Duration 412 | Frame screen-time 414 |
| Frame 1 | 1 | TRUE | 1 | [1] | 208333 | 41.67 ms |
| Frame 1 | 1 | TRUE | 1 | [1] | 208333 | |
| Frame 2 | 1 | TRUE | 1 | [1] | 208333 | 54.17 ms (1 / 48 + 2 / 60) |
| Operating system leaves custom mode due to an event and begins to use standard mode. 430 | | | | | | |
| Frame 2 | 1 | TRUE | [2] | 1 | 208333 | |
| Frame 3 | 1 | TRUE | [1] | 1 | 208333 | 33.33 ms |
| Frame 3 | 1 | TRUE | [1] | 1 | 208333 | |
| Frame 4 | 1 | TRUE | [1] | 1 | 208333 | 50.00 ms |
| Frame 4 | 1 | TRUE | [2] | 1 | 208333 | |
| Frame 5 | 1 | TRUE | [1] | 1 | 208333 | 33.33 ms |
| Frame 5 | 1 | TRUE | [1] | 1 | 208333 | |
| Application receives notification that it is no longer approved for custom mode, no longer queues frames with custom duration. 432 | | | | | | |
| Frame 6 | 1 | FALSE | [1] | N/A | 208333 | 33.33 ms |
| Frame 6 | 1 | FALSE | [1] | N/A | 208333 | |
| Frame 7 | 1 | FALSE | [1] | N/A | 208333 | 50.00 ms |
| Frame 7 | 1 | FALSE | [1] | N/A | 208333 | |
| Frame 7 | 1 | FALSE | [1] | N/A | 208333 | |
| Frame 8 | 1 | FALSE | [1] | N/A | 208333 | 33.33 ms |
| Frame 8 | 1 | FALSE | [1] | N/A | 208333 | |
| Frame 9 | 1 | FALSE | [1] | N/A | 208333 | 50.00 ms |
| Frame 9 | 1 | FALSE | [1] | N/A | 208333 | |
| Frame 9 | 1 | FALSE | [1] | N/A | 208333 | |

FIG.4

MANAGING TRANSITIONS OF ADAPTIVE DISPLAY RATES FOR DIFFERENT VIDEO PLAYBACK SCENARIOS

CROSS-REFERENCE TO RELATED APPLICATION

This application is a continuation of U.S. Ser. No. 15/846,254 filed Dec. 19, 2017, entitled, "MANAGING TRANSITIONS OF ADAPTIVE DISPLAY RATES FOR DIFFERENT VIDEO PLAYBACK SCENARIOS", which is a continuation of U.S. Ser. No. 13/916,623 filed Jun. 13, 2013, now U.S. Pat. No. 9,858,899, entitled, "MANAGING TRANSITIONS OF ADAPTIVE DISPLAY RATES FOR DIFFERENT VIDEO PLAYBACK SCENARIOS", both incorporated herein by reference in their entirety.

BACKGROUND

Computer displays generally update the image on the display sixty times in one second, i.e., with an update rate of 60 Hertz (Hz). Several computer displays allow this rate to be set within a range of possible rates, such as 48 Hz, 50 Hz, 59.94 Hz, 72 Hz and so on.

When video is played back on a computer, a sequence of images, called frames, is displayed on the computer display at a desired playback rate or frame rate. Video typically has frame rates of 24 Hz, 25 Hz, 29.97 Hz, and others. Video can be from movies, animation, games and the like.

For playback of movies, the computer display is preferably set at a refresh rate that is an integer multiple of the frame rate of the video being played back. Otherwise, frames are repeated non-uniformly so as to produce an average frame rate matching the refresh rate of the display. For example, when playing video with a frame rate of 24 Hz on a display with a refresh rate of 60 Hz, some frames are repeated three times, and other frames are repeated only two times, resulting in a frame rate of 60 Hz. The non-uniform repetition of frames is visible and undesirable. Also, a display with a higher refresh rate consumes more power.

Video games have a similar problem. Video games align rendering with when frames can be displayed on the screen to prevent tearing and stuttering artifacts. Because of this alignment, if a game is only able to render at a speed that is less than the refresh rate, then a renderer for the game can be implemented in several ways. In some implementations, stuttering and tearing artifacts are allowed to occur. Another alternative is to render at a non-integer multiple of the frame rate and match frames to the nearest monitor frame. In other implementations, rendering can be throttled to the next factor of the refresh rate. For example, if rendering can only occur at 55 frames per second and the refresh rate is 60 frames per second, then the game renders at 30 frames per second. This pattern continues: if rendering can only occur at less than 30 frames per second, then rendering is performed at 20 frames per second. If the game can render at 55 frames per second, then by changing the refresh rate to 55 Hz from 60 Hz, the game can be displayed at 55 frames per second instead of 30 frames per second, resulting in a more pleasing visual experience.

SUMMARY

This Summary introduces selected concepts in simplified form that are further described below in the Detailed Description. This Summary is intended neither to identify key or essential features of the claimed subject matter, nor to limit the scope of the claimed subject matter.

While it is desirable to enable an application to set the refresh rate of a display to be an integer multiple of the frame rate of the video the application generates, if multiple applications on a computer each are presenting data on the computer display, then the operating system coordinates adjustments to the refresh rate by the applications. In particular, if an operating system of a computer is managing multiple, multitasking applications, each of which is generating data for display, the refresh rate for the computer display is not dependent solely on the frame rate desired by one application. For example, many computer applications create animations in their interfaces based on an assumption that the display rate is 60 Hz, whereas video and game animation can have a variety of playback rates.

To manage dynamic adjustment of the refresh rate of a computer display, the operating system defines at least two playback modes: one or more custom modes that can be selected by applications, and a standard mode which is a default setting for the system that can be expected by applications. The custom mode is not limited to video playback at 48 Hz; custom modes can be defined for games, e.g., 55 Hz, for paint applications, e.g., 120 Hz, and other rates. Each custom mode generally defines a refresh rate that is an integer multiple of the frame rate of video being generated by an application. The custom mode can provide a refresh rate that is higher than in the standard mode, to improve visual quality. The custom mode can provide a refresh rate that is lower than in the standard mode, to improve both visual quality and power consumption. Such modes are particularly useful for battery-powered devices such as portable computers, tablet computers, slate computers, handheld computers, mobile phones and other devices. For video games, such an implementation allows a renderer in a game to produce frames at its highest consistent rate that the system can match.

The operating system solves the problem of making a seamless transition between custom modes and the standard mode in response to various events occurring in the computer.

In general, the operating system initiates a custom mode in response to a request from an application. The operating system provides an application programming interface that enables an application to make such a request, to which the operating system responds with information indicating whether the application can use the custom mode. If approved to use the custom mode, then the application generates video data in a buffer for display based on the custom mode.

A transition back from the custom mode to the standard mode can occur in response to a variety of events. The transition can be initiated by the application or can be in response to events that are asynchronous with the application. However, video data may already be in the buffer for display, generated by the application based on the custom mode.

To solve this problem, the operating system takes advantage of the buffering that is used to play back video. When video data is placed in the buffer, each frame is associated with timing data that indicates the duration for which each frame is displayed using a chosen custom mode or a standard mode. When a transition occurs to the standard mode, the associated timing data is used to playback the video data already in the buffer at the standard mode's refresh rate. The application is notified by the system of the transition back to standard mode. After the application responds to such a notification, the application starts writing data to the buffer with the information that the system display has been transitioned back to the standard mode.

Accordingly, in one aspect, a request from an application is received to present a frame at a custom refresh rate. The frame is buffered. Timing data for displaying the frame at the custom refresh rate and a standard refresh rate different from the custom rate are stored. The buffered frame is displayed on a display according to the timing data. The buffered frame can be displayed on the display at the standard refresh rate or at the custom refresh rate, using the timing data for the refresh rate actually used.

In one implementation, a request is received from an application for available refresh rates, wherein the custom refresh rate is one of the available refresh rates. Available refresh rates are provided to the application in response to the request. In one implementation, it is determined whether an application is approved to use the custom refresh rate. The application is provided with information indicating whether the application is approved to use the custom refresh rate. If the application is not approved to use the custom refresh rate, then frames presented by the application are displayed at the standard refresh rate notwithstanding whether the frames are presented using the custom refresh rate. The operating system for a computer can provide information defining available refresh rates in a format that is consistent across display devices. The operating system also can approve an application to use the custom refresh rate if other applications are not dependent on the standard refresh rate.

These various operations can be performed by the operating system in response to multiple applications running on the computer managed by the operating system. For example the operating system can compute the timing data for the standard refresh rate in response to an application presenting a frame with timing data for playback at the custom refresh rate.

In various aspects, such techniques can be embodied as a computer-implemented process, a computer, and a computer program product, and can be implemented using the operating system of the computer.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is an example implementation of example timing data maintained by the operating system.

FIG. 4 is an additional example of timing data maintained by the operating system.

DETAILED DESCRIPTION

The following section provides an example operating environment which supports adaptive display rates for different video playback scenarios.

Figure 1:
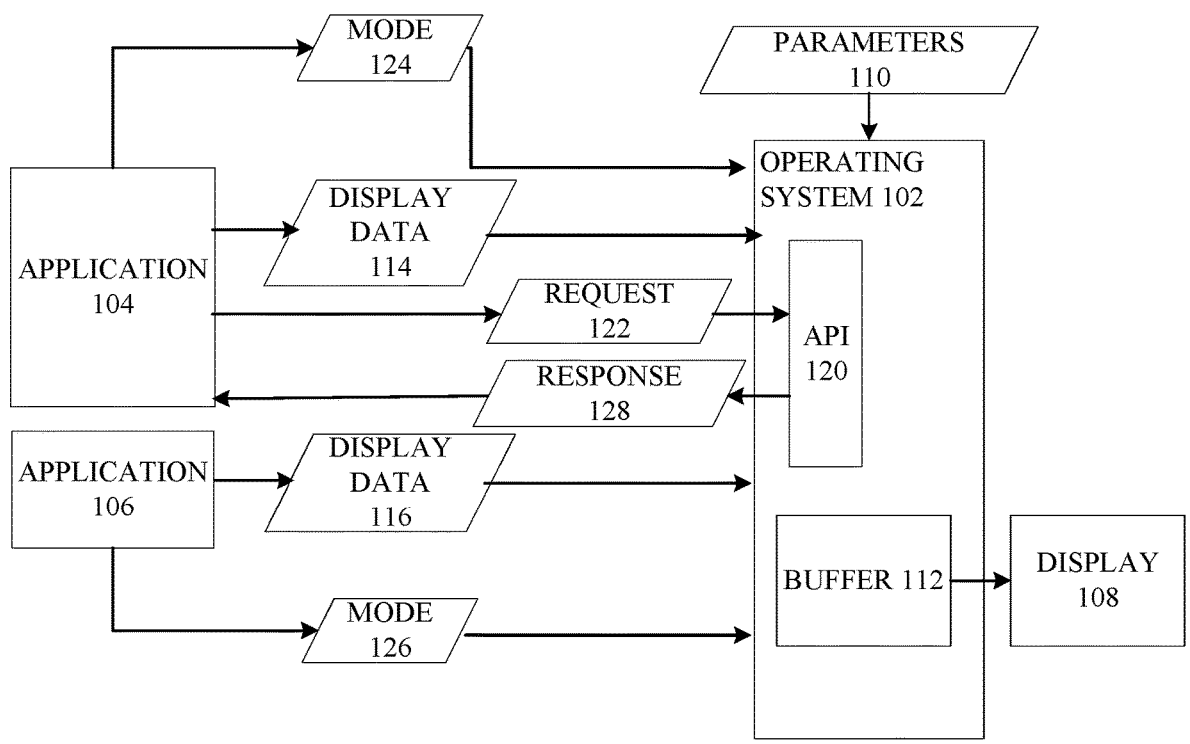
FIG. 1 is a data flow diagram of an example system in which dynamic adjustment of refresh rates can be implemented.

Referring to FIG. 1, a computer 100 includes an operating system 102 that manages access by applications 104 and 106 to resources of the computer, such as a display 108 and other resources of the computer such as described below in connection with FIG. 5. The display has associated parameters 110 indicating the refresh rates it can implement, which is accessible at least by the operating system 102. The display 108 reads data from one or more buffers 112, managed by the operating system, to which applications 104 and 106 provide display data 114 and 116 respectively. The operating system generally manages how the display data 114 and 116 from multiple applications are combined and stored in the buffers 112 for display.

The refresh rates supported by the display 108 are used to define a standard mode, which is a default refresh rate for the operating system to support, and one or more custom modes in which other refresh rates are available and can be selected by applications.

To accommodate applications that can set custom modes, the operating system provides an application programming interface 120. Through the application programming interface, the applications can submit a request 122 for information or for the operating system to perform an operation, to which the operating system provides a response 128 (only application 104 is shown in FIG. 1 as having this exchange for the sake of simplicity). For example, an application can request available refresh rates, to which the operating system responds with the available refresh rates.

Also, an application can request approval to use a custom mode, to which the operating system responds with information about the application's ability to use the custom mode. As described in more detail below in connection with FIG. 2, whether an application is approved to use a custom mode depends on whether a change to the refresh rate to the custom mode affects other applications, which might be dependent on the refresh rate of the standard mode. A variety of conditions can be established for approving an application to use a custom mode. For example, for video playback, an application can be enabled to use the custom mode if a full screen mode of playback is being used.

When an application submits display data 114, 116 for display, the application also indicates the mode 124, 126 in which the display data is to be used. The application can indicate the custom mode if approved for that mode at that time; otherwise the standard mode is used.

After an application has submitted display data for display in a custom mode, it is possible that events may occur after which the operating system switches the display back to standard mode. To properly display data that is already in the video buffer, the application specifies timing data for each frame indicating the playback duration for the frame in the currently selected custom mode; the operating system computes timing data for each frame that specifies the playback duration for the frame in the standard mode. Having the timing data for the standard mode available allow a smooth transition from the custom mode back to the standard mode to occur. The computation and use of such timing data is described in more detail below.

Given this context, an example implementation will be described in more detail in connection with FIGS. 2-5.

Figure 2:
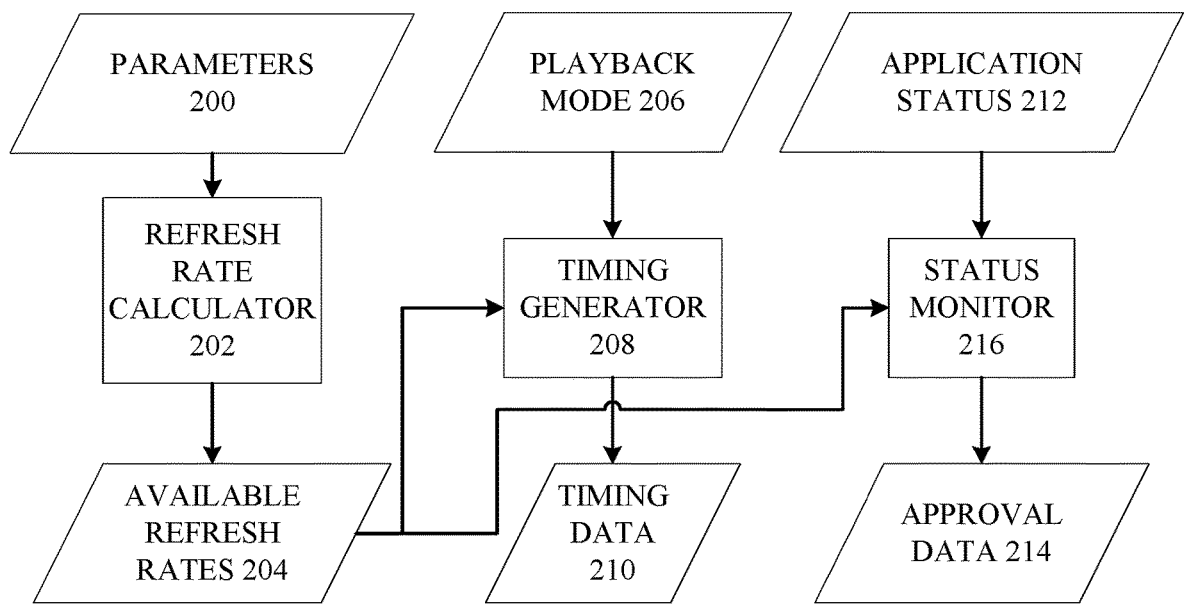
FIG. 2 is a data flow diagram of an example implementation of an operating system that supports such dynamic adjustment of the refresh rate of a display.

FIG. 2 is a data flow diagram of an example implementation of an operating system that supports such dynamic adjustment of the refresh rate of a display.

The operating system maintains parameters 200 (e.g., parameters 110 in FIG. 1) which defines, for a given display, the refresh rates supported by the display and whether the refresh rate of the display is capable of being cleanly switched between frames. Such information is provided for each kind of display to which the computer can be connected, as each kind of display generally is different. This information about a display, i.e., parameters 200, is used by a refresh rate calculator 202 to determine the available refresh rates 204 that can be provided to applications as a custom mode. In general, the operating system ensures that the available refresh rates a presented in a consistent format to applications, regardless of the form of the parameters 200 provided for a given display. Whether the display provides clean transitions when switching refresh rates can be provided by a display manufacturer, determined experimentally, or inferred from information provided about the display, such as identifiers of a chip set used in the display.

In one implementation, the operating system reports supported refresh rates to applications in terms of duration. An example unit of time is 100's of nanoseconds. For example, 60 Hz can be represented by 166667, i.e., 16,666,700 nanoseconds, and 48 Hz can be represented by 208333, i.e., 20,833,300 nanoseconds. In an example implementation of the application programming interface, an application provides a request indicating a desired refresh rate by specifying a duration. In response, the operating system can provide the closest durations available above and below the requested duration, allowing the application to select a duration from among available durations even if the requested duration is not available.

The available refresh rates 204, and an indication of the playback mode 206 for a frame, are used by a timing generator 208 to produce timing data 210 for each frame submitted by an application for playback. An example of such timing data is described in more detail below in connection with FIG. 3. The timing data is used internally by the operating system to manage playback of video during a transition from a custom mode to the standard mode, as described below.

The status 212 of an application, and the available refresh rates 204, are input to a status monitor 216, which provides approval data 214 indicating whether the application is approved to use an available refresh rate as a custom mode. The approval data 214 and available refresh rates 204 can be provided to applications through an operating system API. In one implementation, the status monitor determines whether the application is displaying in a full screen mode (which allows or enables a custom mode) and whether any other application has initiated display of any information (which prohibits or disables the custom mode).

Turning now to FIG. 3, an example implementation of timing data as generated by the operating system will now be described.

The table 300 in FIG. 3 illustrates the various data (by way of an example) provided for each frame, e.g., 302, presented by an application to the operating system for display. In this example, the custom rate is 48 Hz and the standard rate is 60 Hz and the content being displayed is a video with images at 24 Hz. When presenting a frame to the operating system, an application provides, as indicated in columns 304 and 306, an interval, indicating the number of times the frame is to be displayed, and a rate flag, indicating whether a custom frame rate should be used. The operating system, in turn, generates and stores timing data including the standard interval 308, indicating the number of times the frame is to be displayed if the standard refresh rate is used, the custom interval 310 provided by the application, and the custom duration 312, which is the duration of time for which a frame is displayed at the custom refresh rate. During playback at the custom refresh rate, the operating system displays each frame for the designated interval 310 for the designated duration 312.

Referring now to FIG. 4, the table 400 illustrates, by way of an example, what happens when a transition back to the standard rate occurs after some event. This example illustrates particularly when a transition occurs (at 430) between the display of the first instance of frame 2 and the second instance of frame 2. In addition to the columns shown in FIG. 3 (but labeled in FIG. 4 as 404, 406, 408, 410 and 412), FIG. 4 shows, for illustrative purposes, the screen time for the frame in column 414. In this example, after the transition, the refresh rate is set to the standard mode, and the standard interval is used, for each frame so as to provide for a 3-2 pull-down to generate frames 60 Hz from 24 Hz material. In particular, the second instance of frame 2 is repeated. Each instance of frame 3 is presented once, whereas the second instance of frame 4 is repeated.

To compute the standard interval, in one implementation, the operating system can perform the following computation. An accumulator is initialized to zero whenever the application presents a frame using a custom duration after last presenting a frame using the standard duration. The current custom duration is added to the accumulator. The duration of the standard refresh rate is deducted and one frame is added to the standard interval. If the remainder in the accumulator is greater than a threshold, then the duration of the standard refresh rates is deducted again and another frame is added to the standard interval. This process repeats until the threshold is met. The remainder in the accumulator is the accumulated error between the desired playback time and the actual playback time of the last frame. Such a computation is performed for each frame that the application adds to the buffer in the custom mode, with the custom duration being added to the remainder (accumulated error) that is currently stored in the accumulator.

Eventually, the application ceases presenting frames marked as custom mode and starts presenting frames in the standard mode, as indicated at 432. After this point in time the operating system presents the received frames at the standard refresh rate.

Figure 5:
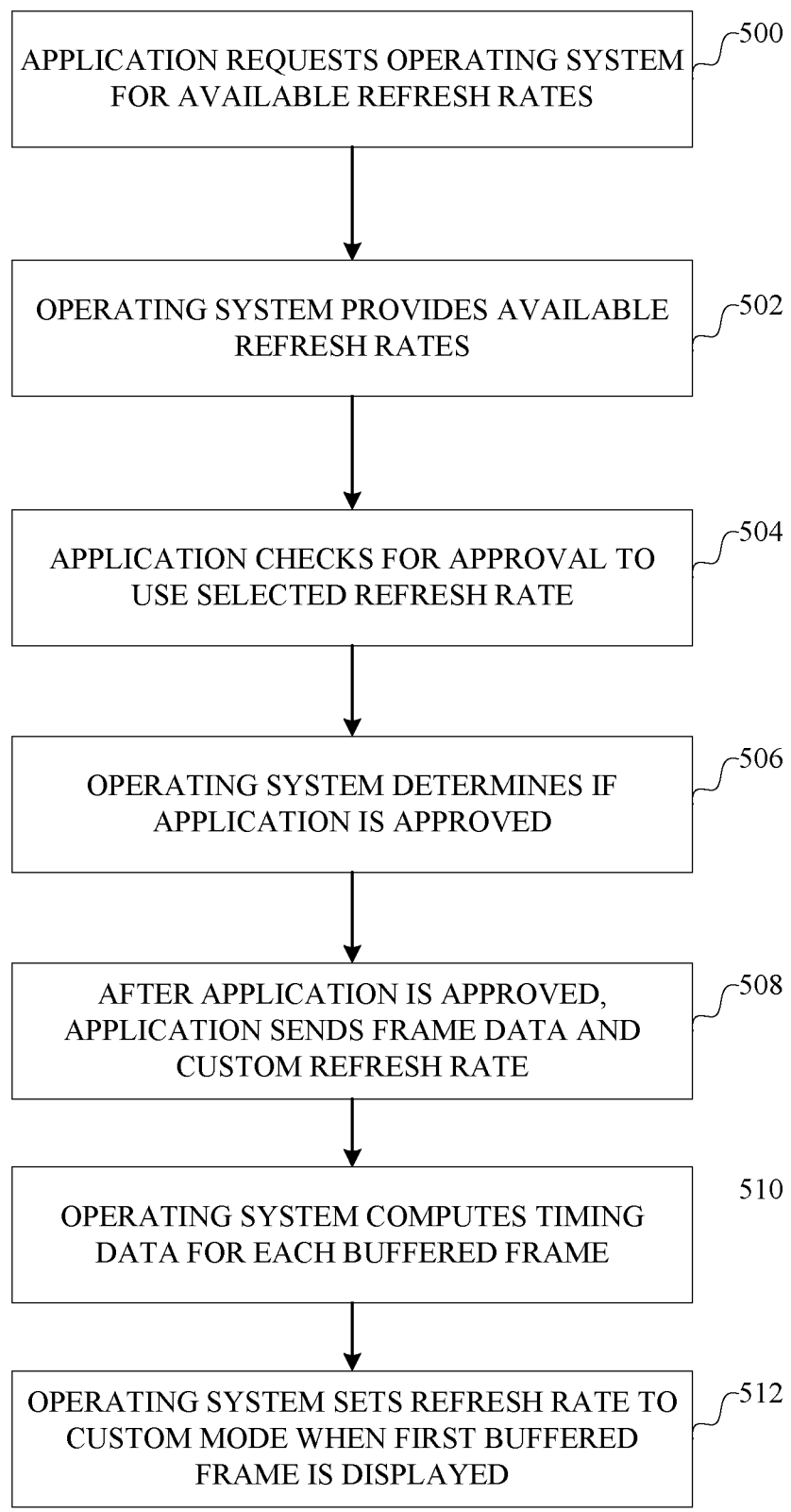
FIG. 5 is a flow chart of an example implementation of changing a refresh rate to a custom mode.
Figure 6:
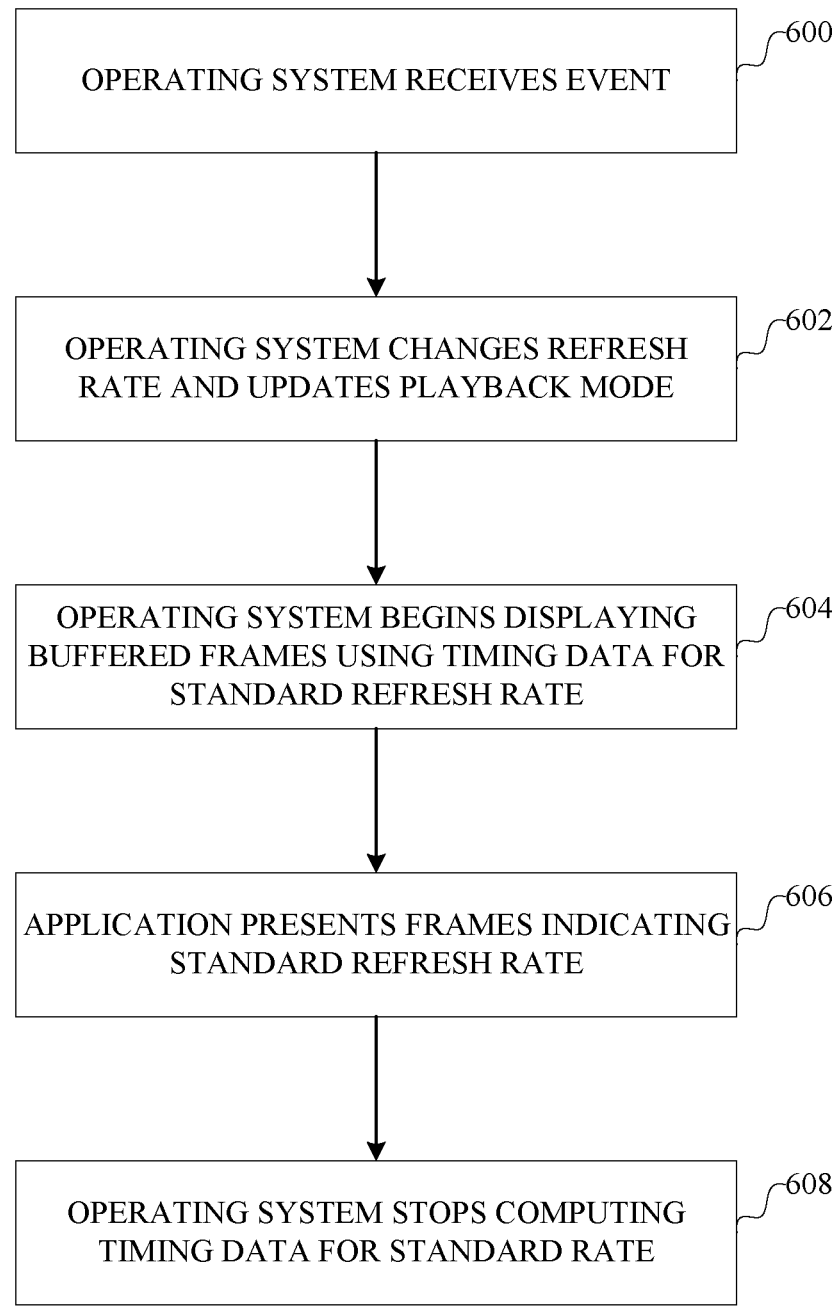
FIG. 6 is a flow chart of an example implementation of changing a refresh rate to a standard mode from a custom mode.

Referring now to FIGS. 5 and 6, a flow chart describing the operation of the computer in an example implementation, in which the operating system computes timing data for the standard mode, will now be described.

When an application has content that can be presented at a custom refresh rate, the application requests 500 the operating system for the available refresh rates. The operating system in turn provides 502 the available refresh rates.

If one of the available refresh rates is selected, such by the application or a user, the application then checks 504 for approval to use the selected refresh rate. Depending on the implementation, such a check can include sending a request to the operating system or polling status information set by the operating system or receiving data from the operating system indicating such a refresh rate can be used. The operating system determines 506 if the application is approved to use the custom rate. This determination can be performed in response to a request from an application, in response to an application submitting a frame flagged for use at the custom rate, or on a periodic basis as an update to status information for an application, or the like.

After an application is approved to use a custom refresh rate, the application begins sending 508 frames of data flagged to be played back at the custom refresh rate. As such frames are buffered, the operating system computes 510 timing data for each buffered frame for displaying the frame in the standard mode. Timing data for the custom mode can be provided by the application or retrieved by the operating system or otherwise made available to the operating system. Timing data for both the standard mode and custom mode are stored. The steps of submitting frames and computing timing data are repeated as the application continues to generate frames and the operating system buffers the generated frames. The refresh rate is changed 512 by the operating system when a buffered frame, flagged for use in the custom mode, is consumed by the operating system for display. The refresh rate remains in the custom mode until playback at the custom refresh rate terminates for some reason.

Referring now to FIG. 6, the operating system receives 600 information about an event which has occurred, and which results in termination of the custom mode and a transition back to the standard mode for the display. If the application itself terminates the custom mode, then the operating system merely changes the refresh rate and updates the playback mode as indicated at 602. The status information for the application being approved to use a custom mode can be changed as well. If the transition to the standard mode occurs for any reason other than the application, then it is probable that the application continues to present frames at the custom refresh rate. Accordingly, the operating system begins 604 displaying buffered frames using timing data for the standard refresh rate. Eventually, the application begins presenting 606 frames at the standard refresh rate. At this time, the operating system can stop computing timing data for standard mode display, because the application is no longer providing frames at the custom rate.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
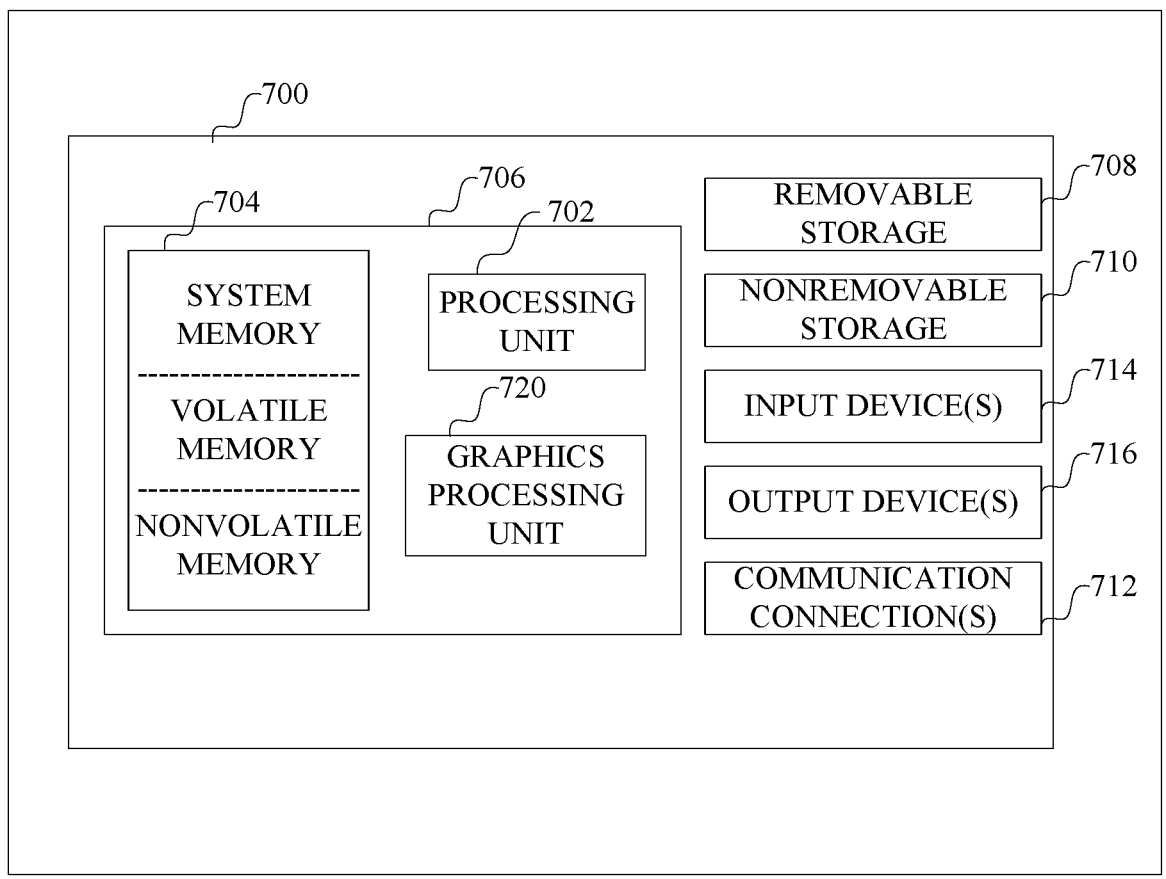
FIG. 7 is a block diagram of an example computer with which components of such a system can be implemented.

FIG. 7 illustrates an example of a suitable computer. This is only one example of a suitable computer and is not intended to suggest any limitation as to the scope of use or functionality of such a computer.

With reference to FIG. 7, an example computer 700, in a basic configuration, includes at least one processing unit 702 and memory 704. The computer may include multiple processing units and/or additional co-processing units such as graphics processing unit 720. Depending on the exact configuration and type of computer, memory 704 may be volatile (such as RAM), non-volatile (such as ROM, flash memory, etc.) or some combination of the two. This configuration is illustrated in FIG. 7 by dashed line 706.

Additionally, computer 700 may also have additional features/functionality. For example, computer 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 700. Any such computer storage media may be part of computer 700.

Computer 700 may also contain communications connection(s) 712 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 712 are devices that interface with the communication media to transmit data over and receive data from communication media, such as a network interface.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

The invention claimed is:

1. A method to adjust a rate at which a computing device displays graphic content, comprising:
   configuring the computing device to render, on a display associated with the computing device, frames of content at variable refresh rates;
   receiving a request from an application executing on the computing device to render frames of content at an initial refresh rate;
   determining whether other executing applications on the computing device are dependent on a previously used refresh rate;
   displaying the frames of content at the initial refresh rate responsive to the determination that the other executing applications are not dependent on the previously used refresh rate;
   determining timing data for displaying frames of content that identifies a playback duration for the frames of content at a different refresh rate relative to the initial refresh rate;
   varying the initial refresh rate to the different refresh rate based on the determination; and
   displaying the frames of content at the different refresh rate according to the determined timing data.

2. The method of claim 1, in which, responsive to the request from the application, the computing device verifies that the computing device is capable of rendering frames of content at the initial refresh rate.

3. The method of claim 2, in which the verifying includes checking with an operating system that the initial refresh rate is usable.

4. The method of claim 1 further comprising:
   providing available refresh rates to the application, wherein the request from the application to render the frames of content at the initial refresh rate is based on the available refresh rates provided to the application.

5. The method of claim 1, in which the frames of content are displayed in the different refresh rate from the initial refresh rate responsive to an occurrence of an event associated with the application which causes termination of the initial refresh rate.

6. The method of claim 1, in which the computing device stops determining timing data for the initial refresh rate after frames of content are displayed at the different refresh rate.

7. The method of claim 1, in which rendering with the variable refresh rates on the display of the computing device enable the computing device to present frames of content for a given application until that application stops generating content at a given refresh rate.

8. A computing device, comprising:
   a display on which frames of content are rendered;
   one or more processors; and
   one or more hardware-based memory devices storing computer-executable instructions which, when executed by the one or more processors, cause the computing device to:
      configure the computing device to render, on a display associated with the computing device, frames of content at variable refresh rates;
      receive a request from an application to render frames of content at an initial refresh rate;
      display the frames of content at the initial refresh rate responsive to the received request;
      generate timing data for displaying the frames of content that identifies a playback duration for the frames of content at a different refresh rate relative to the initial refresh rate;
      vary the initial refresh rate to the different refresh rate based on the generated timing data;
      display the frames of content at the different refresh rate according to the generated timing data; and
      stop determining timing data for the initial refresh rate.

9. The computing device of claim 8, in which, responsive to the request from the application, the computing device verifies, with an operating system, that the computing device is capable of rendering frames of content at the initial refresh rate.

10. The computing device of claim 8, further comprising:
    providing available refresh rates to the application and the request from the application to render frames of content at the initial refresh rate is based on the available refresh rates provided to the application.

11. The computing device of claim 10, in which the available refresh rates are provided to the application through an operating system application programming interface (API).

12. The computing device of claim 8, in which the computing device periodically determines whether the application is approved for use at the initial refresh rate.

13. The computing device of claim 8, wherein the computing device approves the displaying at the initial refresh rate for the application responsive to determining that other executing applications are not dependent on a previously used refresh rate.

14. The computing device of claim 8, in which rendering with the variable refresh rates on the display of the computing device enable the computing device to present frames of content for a given application until that application stops generating content at a given refresh rate.

15. One or more hardware-based computer-readable memory devices storing computer-executable instructions which, when executed by one or more processors disposed within a computing device, cause the computing device to:
configure the computing device to render, on a display associated with the computing device, frames of content at variable refresh rates;
receive a request from an application to render frames of content at an initial refresh rate;
display the frames of content at the initial refresh rate responsive to the received request;
determine timing data for displaying frames of content that identifies a playback duration for the frames of content at a different refresh rate relative to the initial refresh rate;
vary the initial refresh rate to the different refresh rate based on the determination; and
display the frames of content at the different refresh rate according to the timing data, wherein rendering with the variable refresh rates enables the computing device to present the frames of content for a given application until that given application stops generating content at a given refresh rate.

16. The one or more hardware-based computer-readable memory devices of claim 15, in which the executed instructions further cause the computing device to determine whether the application is displaying content in a full screen mode and, based on that determination, enable rendering of the frames of content at the initial refresh rate.

17. The one or more hardware-based computer-readable memory devices of claim 16, in which the executed instructions further cause the computing device to determine whether any other executing application is displaying content, and, based on that determination, prohibiting the rendering of the frames of content at the initial refresh rate.

18. The one or more hardware-based computer-readable memory devices of claim 15, in which the computing device approves the displaying at the initial refresh rate for the application responsive to determining that other executing applications are unaffected by the initial refresh rate.

19. The one or more hardware-based computer-readable memory devices of claim 15, in which the frames of content are displayed in the different refresh rate from the initial refresh rate responsive to an occurrence of an event that is asynchronous with the application.

20. The one or more hardware-based computer-readable memory devices of claim 15, in which the computing device is configured to periodically transition between the initial refresh rate and the different refresh rate.

* * * * *